(12) United States Patent
Tomimatsu

(10) Patent No.: US 10,819,880 B2
(45) Date of Patent: Oct. 27, 2020

(54) DOCUMENT MANAGEMENT SYSTEM THAT PERFORMS MANAGEMENT WHEN DOCUMENTS ARE STORED IN PAPER DOCUMENT FORM

(71) Applicant: KYOCERA Document Solutions Inc., Osaka (JP)

(72) Inventor: Tetsuo Tomimatsu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/516,091

(22) Filed: Jul. 18, 2019

(65) Prior Publication Data
US 2020/0028990 A1 Jan. 23, 2020

(30) Foreign Application Priority Data
Jul. 18, 2018 (JP) .................................. 2018-135139

(51) Int. Cl.
*H04N 1/00* (2006.01)
*H04N 1/44* (2006.01)
(Continued)

(52) U.S. Cl.
CPC ........... *H04N 1/446* (2013.01); *G06F 3/1207* (2013.01); *G06F 3/1243* (2013.01); *G06F 16/51* (2019.01); *G06F 16/587* (2019.01); *G06F 16/5846* (2019.01); *G06F 16/93* (2019.01); *H04W 4/021* (2013.01); *H04W 4/029* (2018.02); *H04W 4/33* (2018.02)

(58) Field of Classification Search
CPC ....... H04N 1/446; G06F 3/1243; G06F 16/93; G06F 16/587; H04W 4/029
See application file for complete search history.

(56) References Cited

U.S. PATENT DOCUMENTS

2014/0025443 A1* 1/2014 Onischuk ............... G07C 13/00
705/12
2014/0258165 A1* 9/2014 Heil .................. G06Q 10/0833
705/333
(Continued)

FOREIGN PATENT DOCUMENTS

JP 2006-309282 A 11/2006

*Primary Examiner* — Benjamin O Dulaney
(74) *Attorney, Agent, or Firm* — Hawaii Patent Services; Nathaniel K. Fedde; Kenton N. Fedde

(57) ABSTRACT

Provided is a document management system that appropriately performs management of paper documents even in a case where there is a change in the storage conditions and the like of paper documents. A server causes an image forming apparatus to output a management label. A worker enters items necessary for management in this management label, after which the label is attached to a package including paper documents (documents) that is a target of management, and the package is stored in this state. A portable terminal that can capture an image of the management label on the package in a stored state is used. The portable terminal and the image forming apparatus may perform an exchange of data via a network, short distance communication, or the like. This data includes image data (imaging data) acquired by capturing an image of the management label, and storage location information indicating the storage location of the package.

8 Claims, 11 Drawing Sheets

(51) Int. Cl.
*G06F 3/12* (2006.01)
*H04W 4/029* (2018.01)
*G06F 16/51* (2019.01)
*H04W 4/021* (2018.01)
*G06F 16/93* (2019.01)
*G06F 16/587* (2019.01)
*G06F 16/583* (2019.01)
*H04W 4/33* (2018.01)

(56) References Cited

U.S. PATENT DOCUMENTS

2017/0032313 A1* 2/2017 McCullough ........ G06K 7/1413
2017/0270472 A1* 9/2017 High .................... G06Q 10/083
2019/0035497 A1* 1/2019 Kolberg ............. G06K 7/10881

* cited by examiner

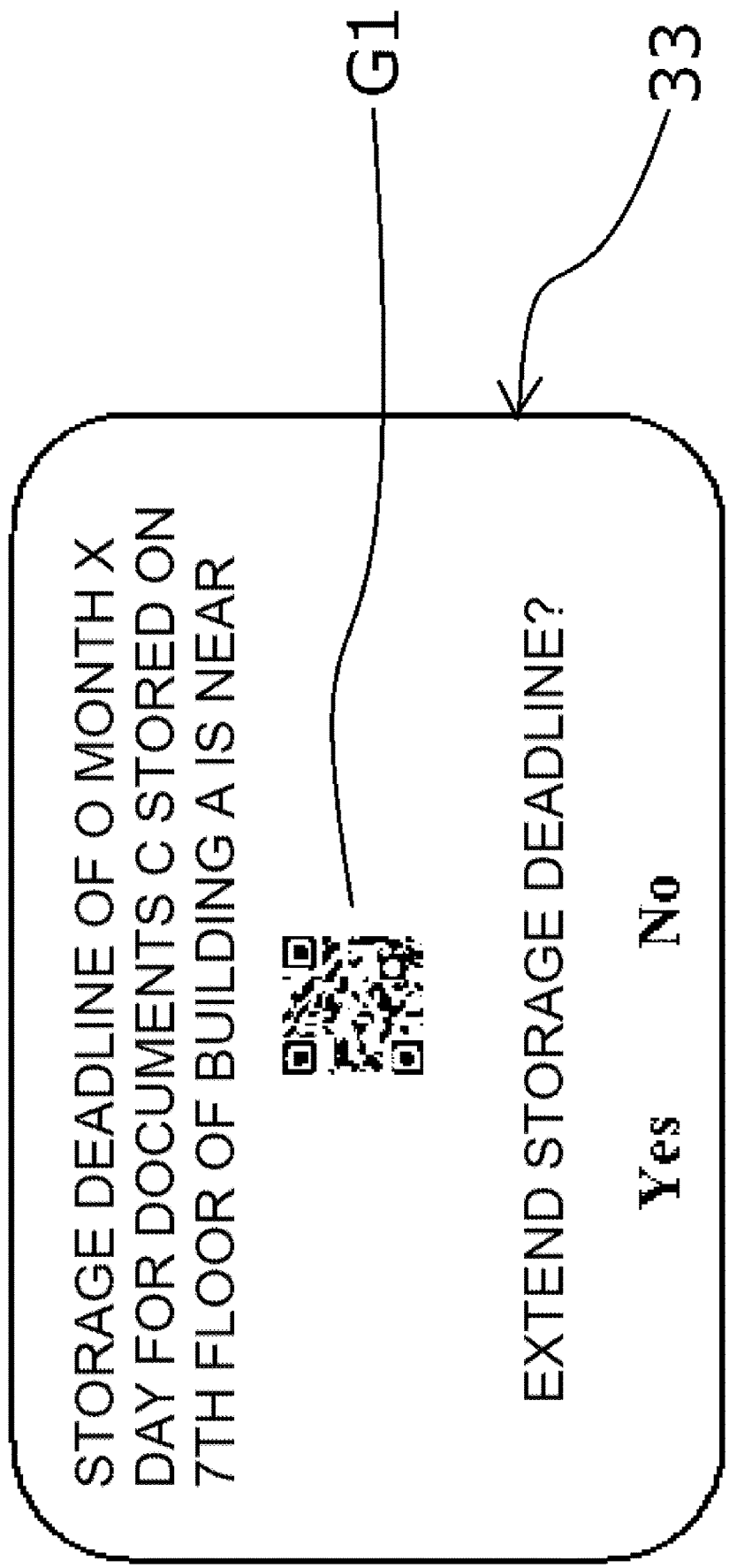

DOCUMENT MANAGEMENT SYSTEM THAT PERFORMS MANAGEMENT WHEN DOCUMENTS ARE STORED IN PAPER DOCUMENT FORM

INCORPORATION BY REFERENCE

This application is based on and claims the benefit of priority from Japanese Patent Application No. 2018-135139 filed on Jul. 18, 2018, the contents of which are hereby incorporated by reference.

BACKGROUND

The present disclosure relates to a document management system that performs management when documents are stored in a form of paper documents.

As the form for storing documents (various documents), there are cases where documents may be stored as electronic files on a hard disk, storage medium or the like, or cases where documents may be physically stored as a package in which printed documents (paper documents) are packed. Here, compared to the number of documents storable on a hard disk or storage medium generally used in the former case, the number of paper documents that can be accommodated in a single package is smaller in the latter case. In addition, a package in the latter case is large, so in a case where the number of paper documents or the number of pages to be stored is large, the storage locations for those documents are often varied. In this case, it is required to appropriately recognize this storage location. Moreover, generally, a storage deadline is set for paper documents, and it is necessary to promptly discard the paper documents after the storage deadline is reached.

Typical techniques include a document management system such as described below. In a case of storing documents in both of these forms, in order to clarify the correspondence relationship between the two forms, information regarding a storage location for paper documents corresponding to an electronic file is stored as attribute information of the electronic file. Together with that, paper documents are provided with a coded image as information for specifying a corresponding electronic file. In addition, the document management system stores in advance a storage deadline for each document. Therefore, the document management system may appropriately recognize the storage location and storage deadline of paper documents corresponding to each stored electronic file, and in a case where a storage deadline is near, once the storage location of the target paper document has been identified, a warning can be issued to the administrator indicating that the storage deadline is near. As a result, a disposal process for the paper documents may be appropriately performed.

SUMMARY

The document management system according to the present disclosure is a document management system that performs management of a package that stores documents, and uses a management label provided with items in which administrator information identifying an administrator of the documents, and a storage deadline of the documents are described, and to which own identification information is given. The document management system has a portable terminal and an information processing apparatus. The portable terminal has an imaging unit, a location recognition unit, and a portable terminal side control unit. The imaging unit obtains imaging data of a captured image of the management label attached to the package after the administrator information and the storage deadline are entered. The location recognition unit recognizes own location information. The portable terminal side control unit transmits storage location information, which is information related to the storage location of the package recognized based on the location information, and imaging data. The information processing apparatus has a storage unit and information processing apparatus side control unit. The storage unit stores management information as a group of information in which the administrator information and the storage deadline recognized from the imaging data, and the storage location information are correlated with the identification information for each of the identification information. The information processing apparatus side control unit compares the storage deadline for each management information with the current date and time, and in case where there is management information having a storage deadline that is near the current date and time, issues a warning to the administrator recognized by the administrator information in the management information.

BRIEF DESCRIPTION OF THE DRAWINGS

FIG. 11 is an example of a warning screen when the storage deadline of a paper document is near in the document management system of an embodiment according to the present disclosure.

DETAILED DESCRIPTION

Figure 1:
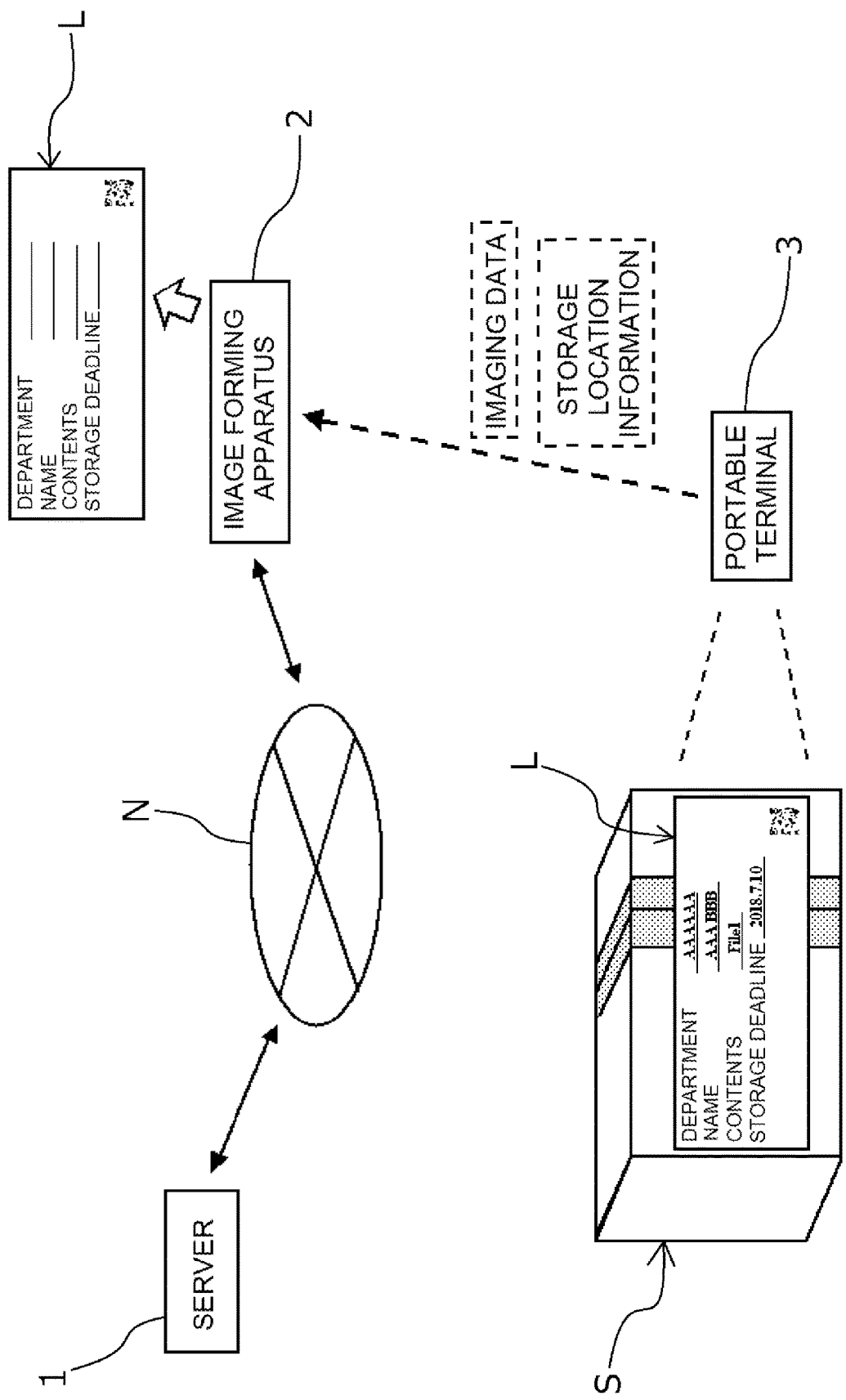
FIG. 1 is a diagram illustrating a configuration of a document management system of an embodiment according to the present disclosure.

In the following, a document management system of an embodiment according to the present disclosure will be described. FIG. 1 is a diagram schematically illustrating the overall configuration of this document management system. In this document management system, a server (information processing apparatus) 1 for performing overall management and an image forming apparatus 2 connected to the server 1 via a network N are used. The server 1 causes the image forming apparatus 2 to output a management label L. This management label L is attached to a package S accommodating the paper documents (documents) that is a target of management, after the items necessary for management are entered by the worker, and the package S is stored in this state. Incidentally, here a document stored as an entity rather than as an electronic file, is referred to as a "paper document", and even when the object on which recording is performed is a synthetic resin or the like instead of paper, that object is also included as a "paper document" in the following.

A portable terminal 3 that can capture an image of the management label L on a package S that is in a stored state as described above is used. The portable terminal 3 and the image forming apparatus 2 may perform an exchange of data via a network, short distance communication, or the like. The data includes image data (imaging data) acquired by capturing an image of the management label L, and storage location information indicating a storage location of the package S.

The server 1 performs management of many paper documents (package S) using the image forming apparatus 2. Here, in this document management system, it is particularly possible to easily and surely perform an operation of constantly updating information regarding storage locations and storage deadlines of paper documents. Therefore, in a case where the storage deadline of a paper document is near, the server 1 may appropriately communicate that information to the administrator by electronic mail or the like.

Figure 2:
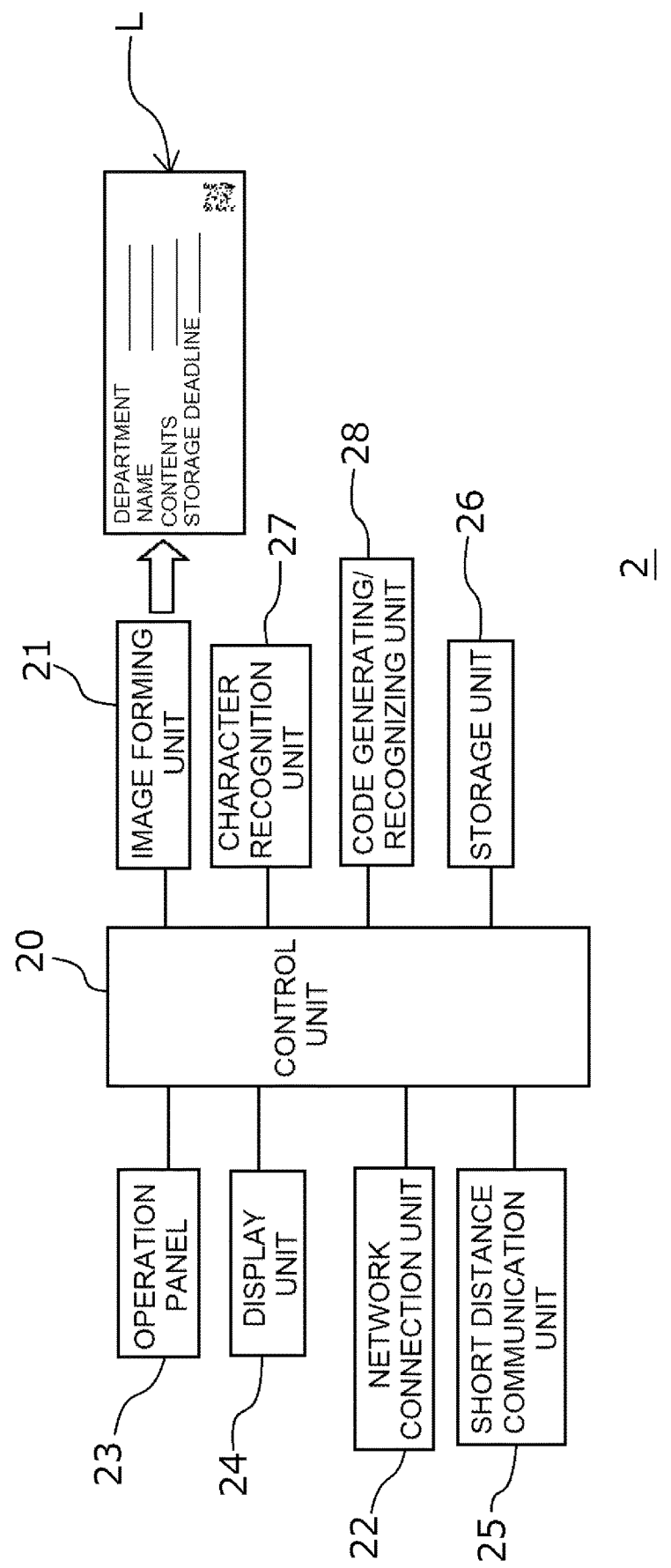
FIG. 2 is a diagram illustrating a configuration of an image forming apparatus that is used in the document management system of an embodiment according to the present disclosure.

FIG. 2 is a diagram illustrating the configuration of the image forming apparatus 2. In FIG. 2, the image forming apparatus 2 includes a control unit (image forming apparatus side control unit) 20 that performs overall control, and an image forming unit 21 for performing work of forming and outputting an image pattern composed of toner on a medium (paper). Particularly, the image forming unit 21 may output a management label L. In addition, a network connection unit 22 for connecting to the server 1 via a network N, an operation panel 23 for the user to operate, and a display unit 24 for displaying various information at this time are provided. Moreover, a short distance communication unit 25 for performing short distance communication with the portable terminal 3 is provided. Furthermore, a storage unit 26 that is configured by a hard disk or nonvolatile memory and stores various data is provided.

In addition, a character recognition unit 27 that recognizes characters in an image in the imaging data acquired from the portable terminal 3 is provided. Moreover, a code generating/recognizing unit 28 that converts the identification information of a paper document (or the package S corresponding to this) into a code image (for example, QR code (registered trademark)) or that conversely reads the corresponding identification information from the code image in the read image data is provided.

Figure 3:
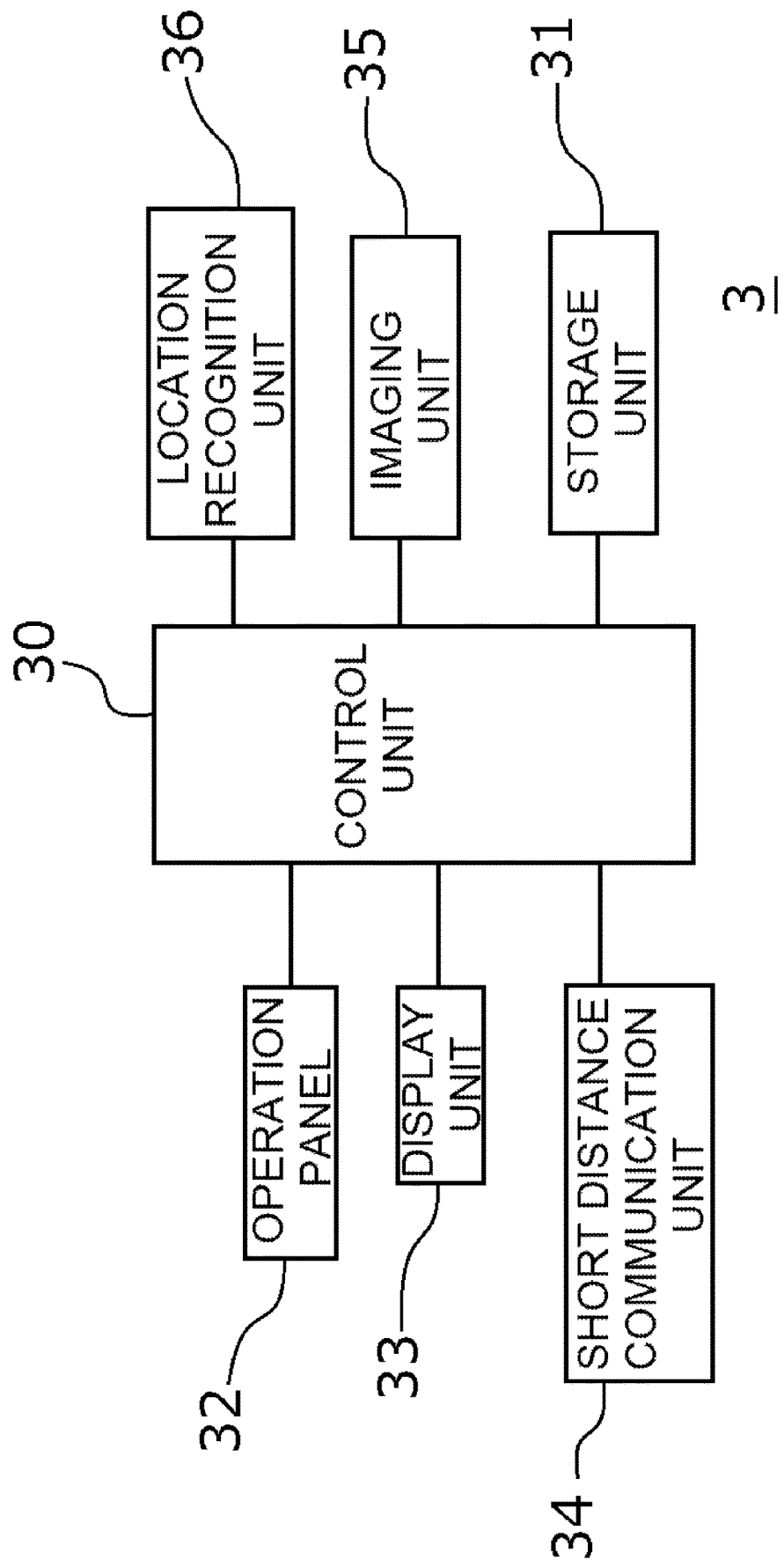
FIG. 3 is a diagram illustrating a configuration of a portable terminal that is used in the document management system of an embodiment according to the present disclosure.

FIG. 3 is a diagram illustrating the configuration of the portable terminal 3. The portable terminal 3 also includes a control unit (portable terminal side control unit) 30, a storage unit 31, an operation panel 32, a display unit 33, and a short distance communication unit 34. The portable terminal 3 is small in size, so actually, a touch panel display in which the operation panel 32 and the display unit 33 are integrated is used. In addition, an imaging unit 35 capable of acquiring an image file (imaging data) by performing imaging of a specific area by a user adjusting the spatial position, posture, and the like of the portable terminal 3 is provided. In addition, a location recognition unit 36 that recognizes the portable terminal's own location using a GPS signal is also provided. The functions described above are the same as those of a generally known smartphone or the like.

Figure 4:
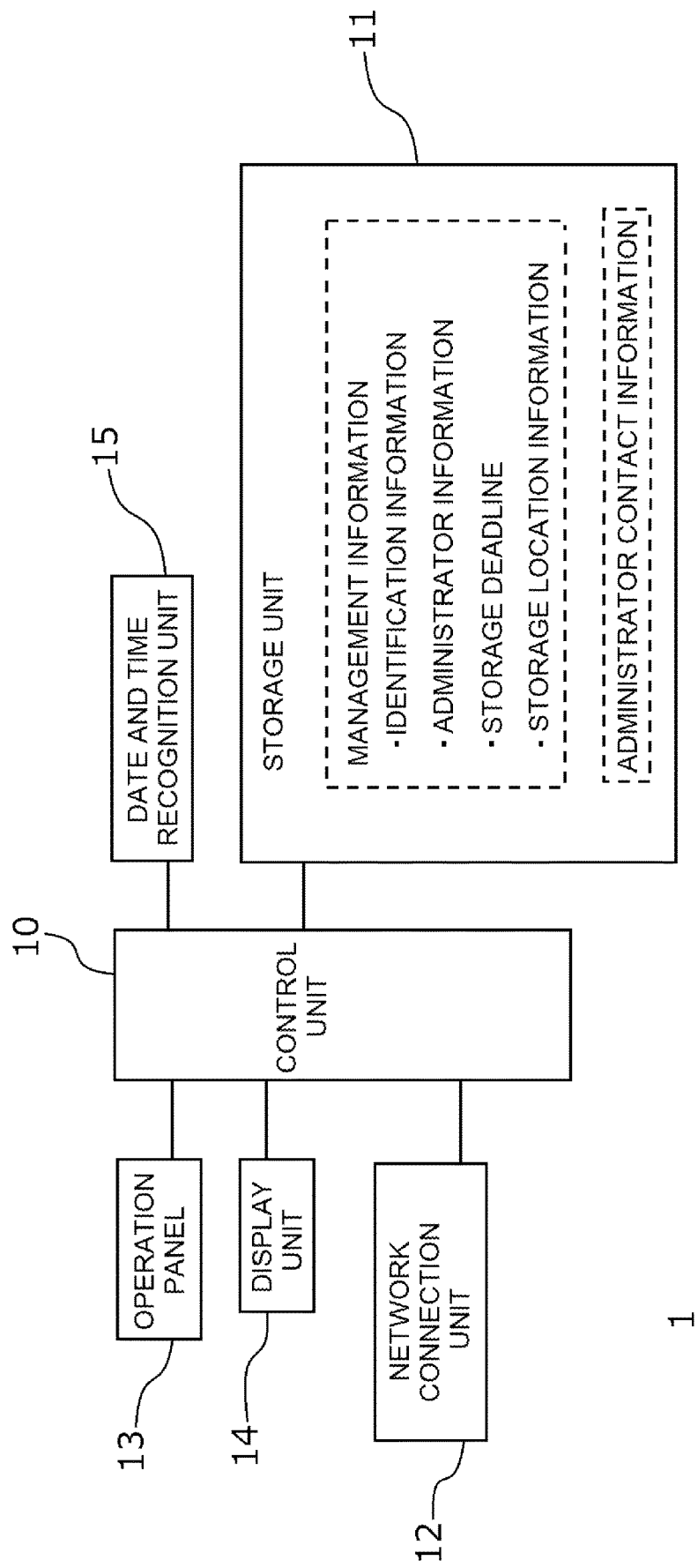
FIG. 4 is a diagram illustrating a configuration of an information processing apparatus that is used in the document management system of an embodiment according to the present disclosure.

FIG. 4 is a diagram illustrating the configuration of the server (information processing apparatus) 1. The server 1 also includes a control unit (information processing apparatus side control unit) 10 that performs overall control, a storage unit 11, and a network connection unit 12 that functions as an interface for connecting to the network N. In addition, an operation panel 13 for receiving instructions from the user, and a display unit 14 that includes a display for displaying information necessary at this time are provided. Moreover, a date and time recognition unit 15 is also provided to recognize the current date and time. These configurations are no different from those of an ordinary personal computer (computer).

Here, in the storage unit 11, management information, which is data for managing a plurality of stored paper documents, is stored for each paper document. Actually, since paper documents are stored for each package S, the management information is created for each package S. Here, the contents stored as management information are (1) administrator information, (2) document information (document name, and the like) for specifying contents, (3) storage location information, and (4) storage deadline, and these are treated as a group of data for each identification number (identification information) assigned to the management label L. As the administrator information (1), there is (1-1) a department to which the administrator belongs, and (1-2) an administrator name. As the storage location information (3), in a case where the package S is a room in a building or the like, for example, there is (3-1) location information of the building, and (3-2) information for identifying the location inside the building such as the room number, floor number or the like, and the like. Moreover, in response to this management information, administrator contact information, which is a contact address of each administrator, is also stored for each administrator. As the administrator contact information, for example, a contact address such as an electronic mail address that is used when the server 1 contacts the administrator via the network N or the like is stored.

The management label L is attached to the package S, so in a case where there is a plurality of packages S, an identification number described above may be associated with each package S. The control unit 10 recognizes the current date and time by the date and time recognition unit 15, and recognizes the storage deadline from the management information for each paper document (package S) stored in the storage unit 11, then compares these with the current date and time. As a result, when the current date and time is near the storage deadline (for example, the storage deadline is within the current one month), the control unit 10 may send a notification (warning) to the contact address of the corresponding administrator indicating that. At this time, by simultaneously contacting and informing the administrator of (3) the storage location information of the paper document, the administrator may quickly perform a disposal process to dispose of the paper document. Alternatively, depending on the situation, the paper document may be stored again after extending the storage deadline. At this time, the storage location may also be changed.

In the document management system described above, by using the management label L outputted by the image forming apparatus 2 and the portable terminal 3 in FIG. 1, management of (3) the storage location information and (4) the storage deadline as the management information described above in this case may particularly be performed properly. Therefore, even in a case where there is a change in the storage location and storage deadline of the package S, the control unit 10 may appropriately recognize the contents after the change and appropriately issue the warning described above.

Figure 5:
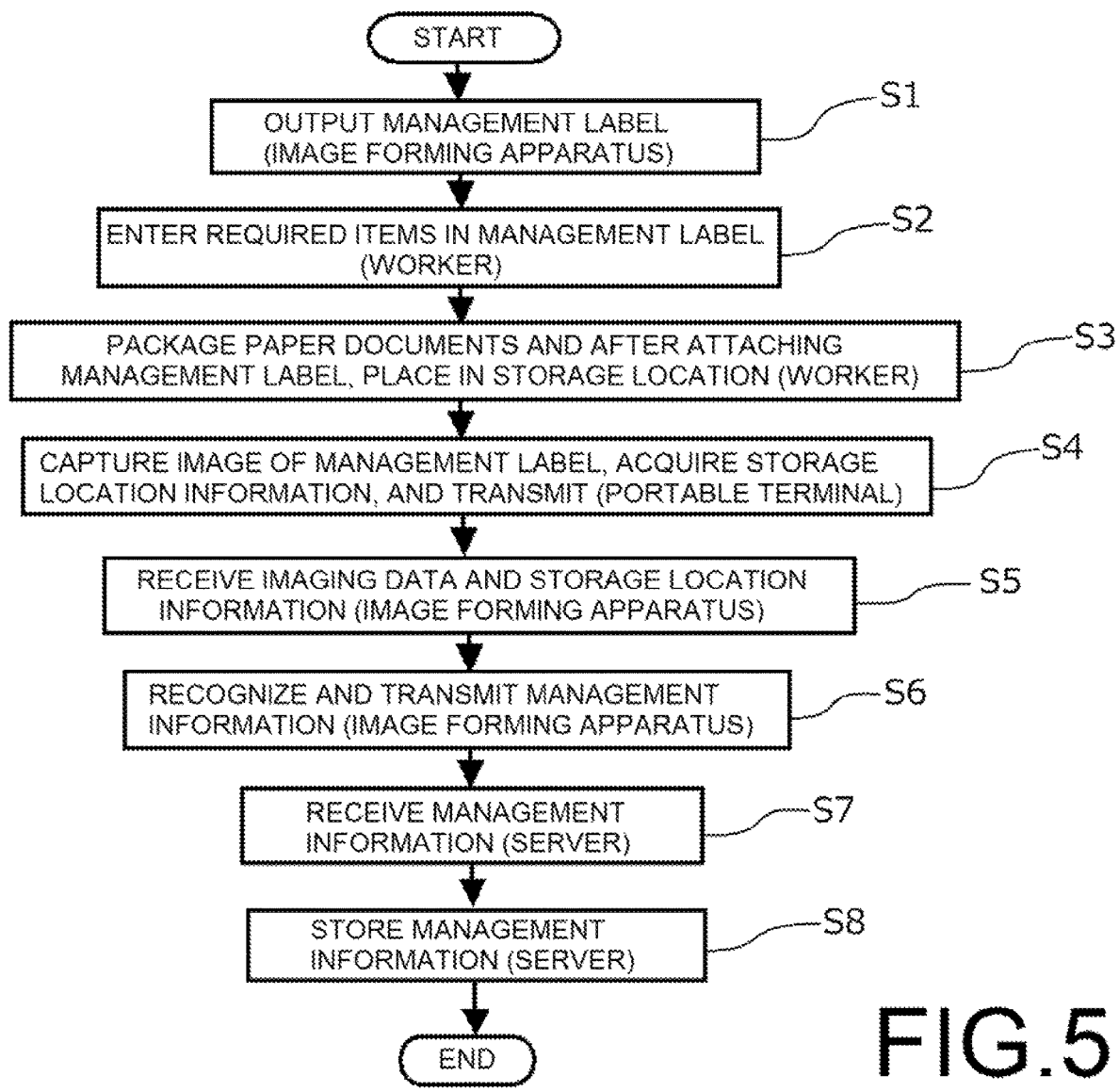
FIG. 5 is a flowchart illustrating operation when newly storing a paper document in the document management system of an embodiment according to the present disclosure.
Figure 6:
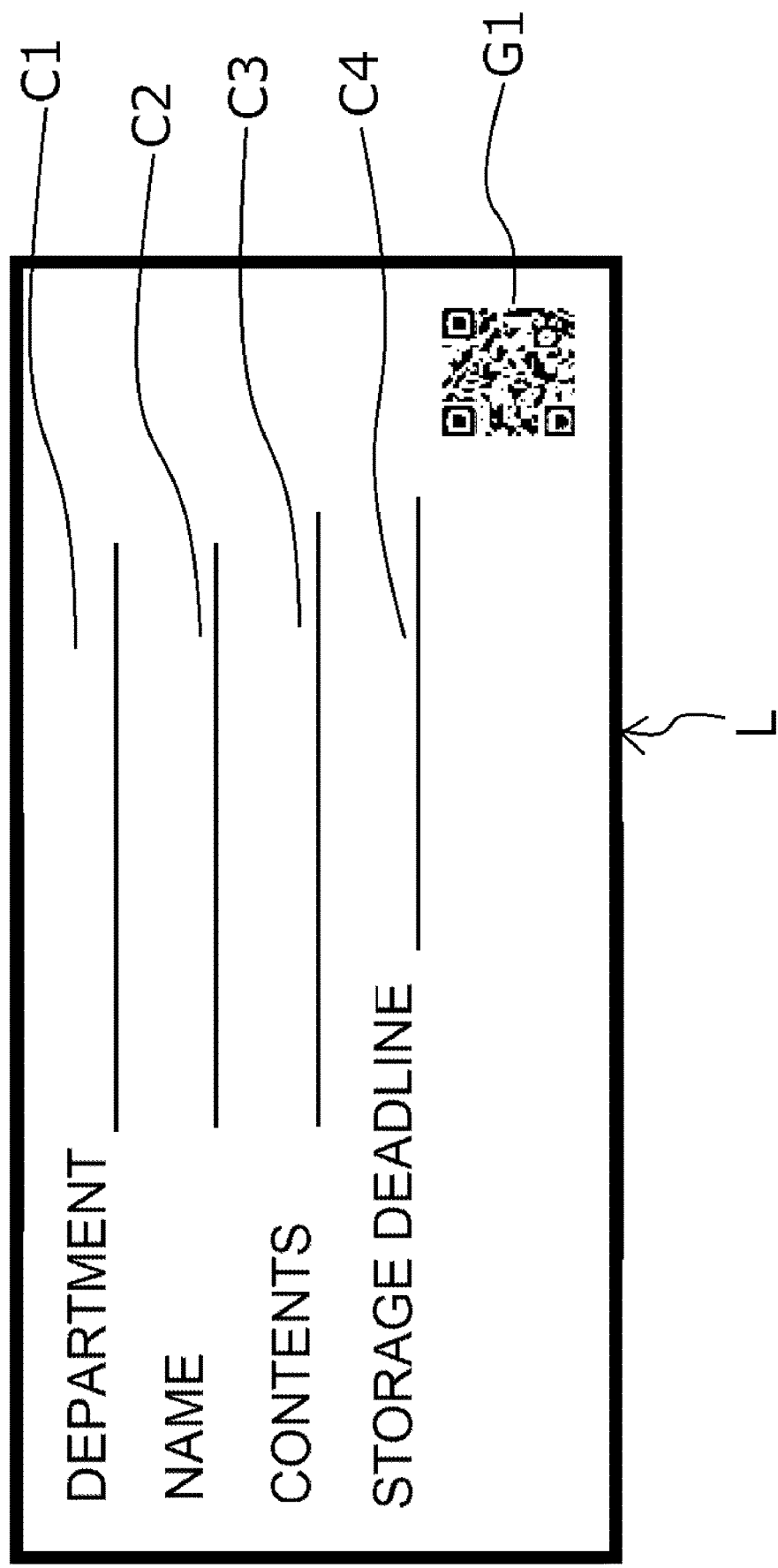
FIG. 6 is an example of a management label that is used in the document management system of an embodiment according to the present disclosure.

The operation to be performed for this will be described in detail below. Here, first, an operation in a case of newly storing a paper document will be described. FIG. 5 is a flowchart illustrating an operation performed in the document management system described above at this time. Here, first, the worker operates the server 1 and causes the image forming unit 21 of the image forming apparatus 2 to output a management label L for which a description is performed on a sheet of paper such as illustrated in FIG. 6 (S1). This operation may be performed by the operation panel 23 of the image forming apparatus 2 without using the server 1.

The management label L is attached to the package S, so there is a one-to-one correspondence between the management label L and the package S or a paper document in the package S. Therefore, at this time, a management number is added to the management label L as identification information, and the code image G1 obtained by converting this management number into a QR code (code image) by the code generating/recognizing unit 28 is formed in part of the management label L. In addition, the configuration of the descriptions on the sheet of paper is as described below, respectively. In the management information described above, the content corresponding to (1-1) the department to which the administrator belongs is described in the item "department" as characters (C1 in FIG. 6). The content corresponding to (1-2) the administrator name described above is described in the item "administrator name" as characters (C2 in FIG. 6). The content corresponding to (2) the document information (document name or the like) described above is described in the item "contents" as character information (C3 in FIG. 6). The content corresponding to (4) the storage deadline described above is described in the item of "storage deadline" as character (numbers) information (C4 in FIG. 6).

A worker uses a pen or the like to enter each of the items described above in the management label L (S2). Therefore, from the contents described in C1 to C4 in FIG. 6, it is possible to recognize (1) the administrator information, (2) the document information, and (4) the storage deadline as character information of the management information described above. However, (3) the storage location information in the management information cannot be recognized from the description in the management label L. After that, the worker creates a package S by packaging the paper documents that is a target of storage, attaches the management label L after entering description described above to the package S, and places the package S in a desired storage location (S3). Note that the "administrator" described above and the "worker" described above do not need to be the same.

Figure 7:
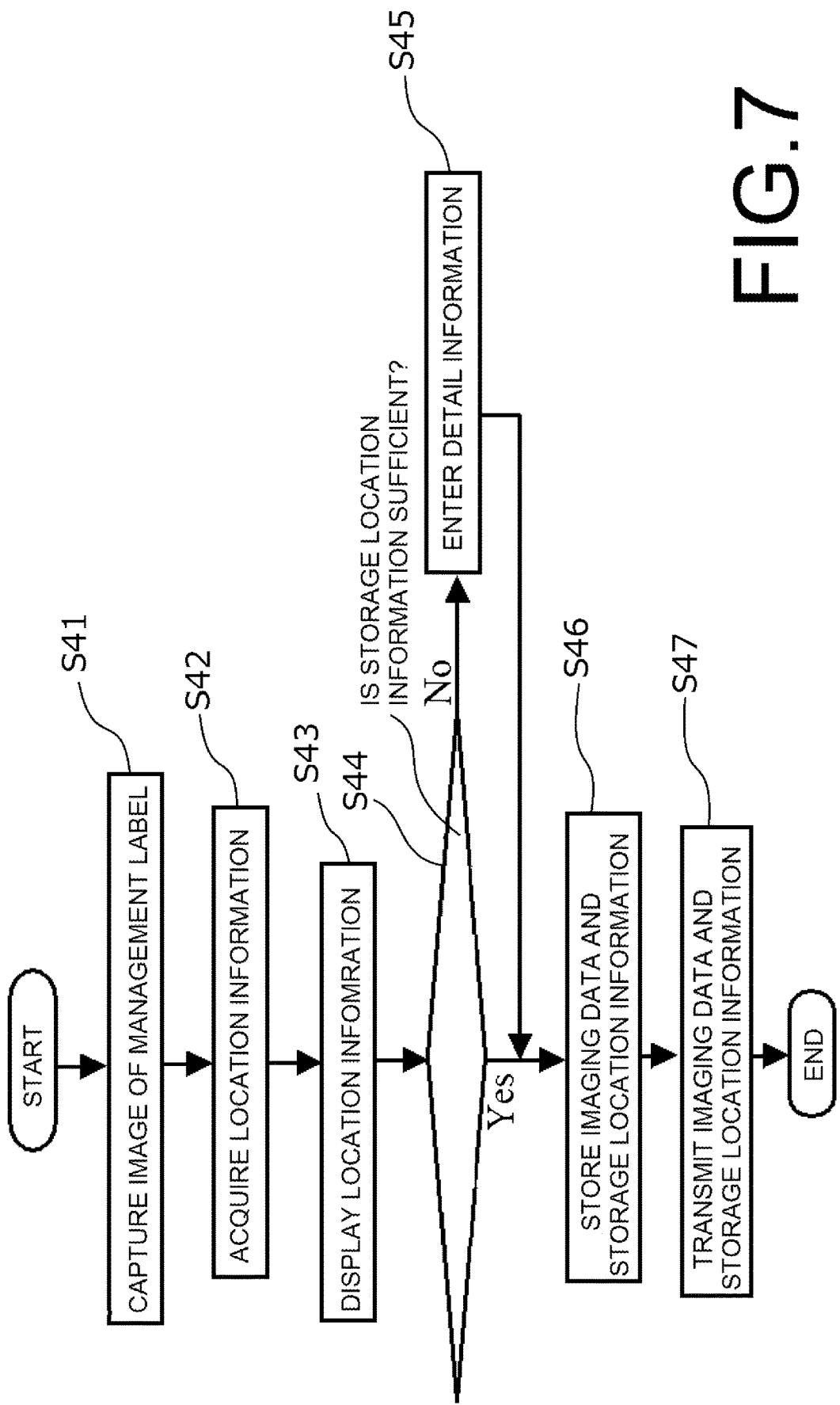
FIG. 7 is a flowchart illustrating operation of the portable terminal when newly storing a paper document in the document management system of an embodiment according to the present disclosure.

In this state, the worker captures an image of the management label L using the held portable terminal 3 and acquires the location information of the portable terminal 3 (S4). This operation is actually performed by application software that is installed in the portable terminal 3. FIG. 7 is a flowchart of the operation that is performed by the control unit 30 in the portable terminal 3 at this time. First, the control unit 10 causes the display unit 33 to display a message such as "Please capture an image of the management label" or the like, and prompts the worker to capture an image of the management label L (S41). At this time, the worker may confirm on the screen of the display unit 33 whether or not an image of the management label L has been properly captured. As a result, imaging data in which an image of the management label L is captured by the imaging unit 35 is obtained. Next, the control unit 30, by the location recognition unit 36, acquires the location information of the portable terminal 3 (S42). The location information that is acquired here is, for example, the latitude and longitude of the location where the portable terminal 3 is currently located, and when map information can be acquired, the name of the building (building or the like) can also be further recognized.

The control unit 30 causes the display unit 33 to display the information acquired as described above (S43). The worker may determine whether the information displayed here is sufficient as information for identifying the storage location (S44). Here, for example, when it is recognized that the storage location is a building as described above, a case will be described in which it is determined that it is not sufficient to specify just the building and that information (detailed information) further specifying the floor and the room in the building is necessary (S44: NO). In this case, the control unit 30 causes the display unit 33 to display that the input of the detailed information is to be performed by the operation panel 32, and the worker may perform input of this detailed information (S45). The input at this time may be appropriately performed by character input or, in the case of specifying a floor, numeric input or the like. For example, in a case where there is only one storage location in a single building, and for example, it is sufficient to specify the storage location by simply specifying the building (S44: YES), this kind of detailed information becomes unnecessary.

The control unit 30 stores the imaging data (S41), the location information (S42) or further the detailed information (S45) acquired as described above in the storage unit 31 as a management information group of data (S46). After that, the worker carrying the portable terminal 3 leaves this storage location, goes to a location in the proximity of the image forming apparatus 2, and transmits this group of data to the image forming apparatus 2 by the short distance communication unit 34 (S47). Alternatively, this group of data may be transmitted via the network N. The group of operations (S41 to S47) in the portable terminal 3 described above may be performed by the application software described above.

Figure 8:
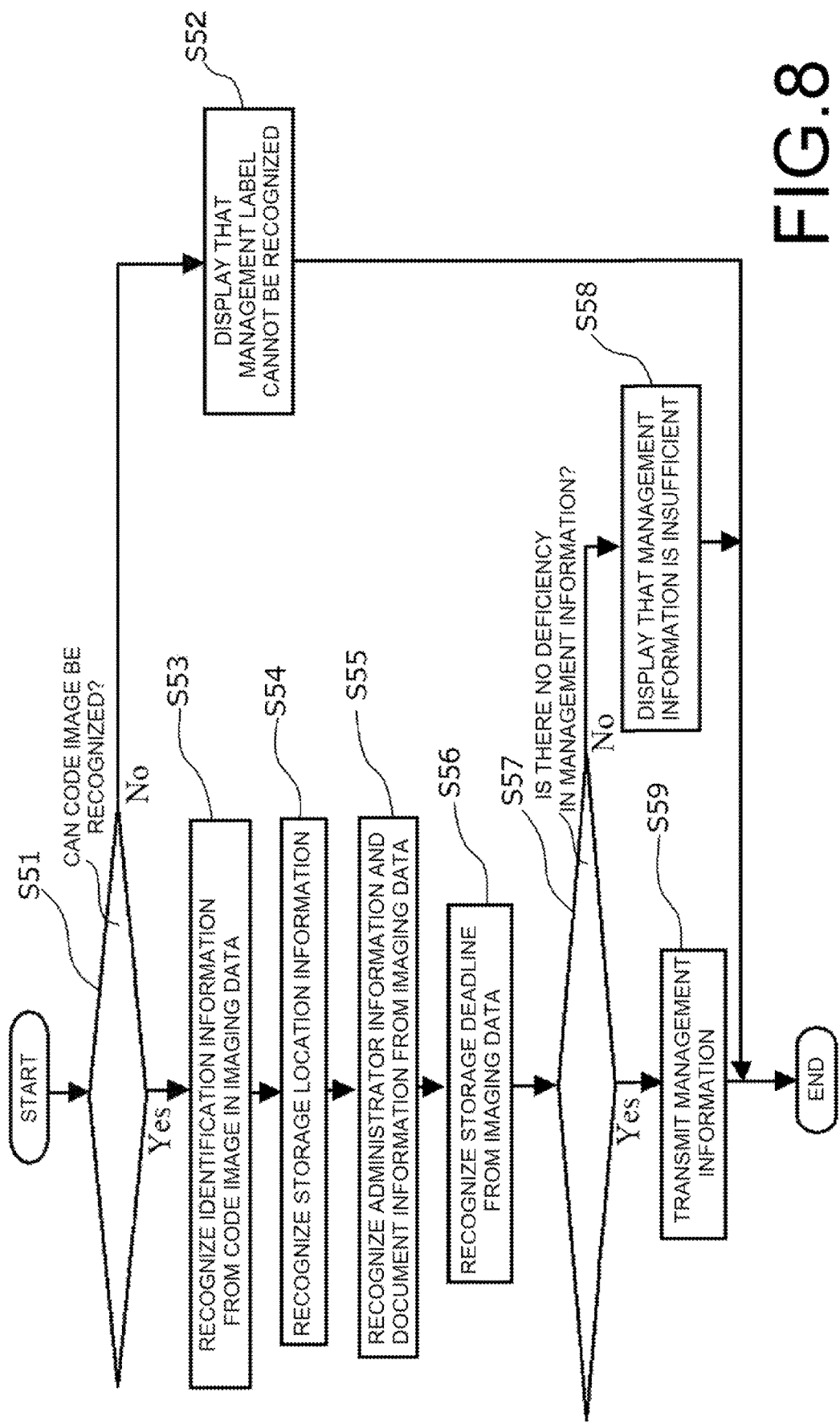
FIG. 8 is a flowchart illustrating operation after the image forming apparatus receives data from the portable terminal in the document management system of an embodiment according to the present disclosure.

In FIG. 5, the image forming apparatus 2 receives this group of data (S5). The control unit 20, from the group of data acquired as described above, recognizes the management information of the package S to which the management label L of which an image is captured is attached and transmits that management information to the server 1 (S6). FIG. 8 is a flowchart of the operation that is performed by the control unit 20 in the image forming apparatus 2 at this time. In FIG. 8, after receiving the data described above, the control unit 20 confirms the presence or absence of the code image G1 in FIG. 6 from the received imaging data (S51). In a case where the code image G1 is not recognized (S51: NO), it is recognized that an image of the management label L is not appropriately captured, or that the management label L described above is not used, so the control unit 20 causes the display unit 24 to display this (S52), and the process ends. In this case, the worker may output the management label L in FIG. 5 (S1) again, or may perform the work again starting from entering the necessary items (S2).

In a case where the code image G1 is recognized (S51: YES), it is recognized that a management label L is being used, so the management number (identification information) assigned to the management label L is recognized from the code image G1 by the code generating/recognizing unit 28 (S53). Furthermore, the received location information (including the detailed information described above) is recognized as (3) the storage location information in the management information (S54).

Next, the control unit 20, using the character recognition unit 27, can recognize information from the received imaging data as respective character information as described below (S55). From the characters recognized in the item C1 in FIG. 6, (1-1) the department to which the administrator belongs described above may be recognized. From the characters recognized in the item C2, (1-2) the administrator name described above may be recognized. From the characters recognized in the item C3 in FIG. 6, (2) the document information described above may be recognized. Similarly, the control unit 20, from the received imaging data, can recognize (4) the storage deadline described above from the characters recognized in the item C4 in FIG. 6 (S56). Here, in a case where in the recognition described above (S55, S56) these items of information are not properly recognized; for example, in a case where numbers corresponding to the storage deadline are not recognized in the recognition of the storage deadline (S56) or the like, NULL is recognized as the corresponding information.

Based on this, a case where each item of information is properly recognized as described above (when there are no NULL items) will be described. In this case, as the management information, (1-1) the department to which the administrator belongs, (1-2) the administrator name, (2) the document information, (3) the storage location information, and (4) the storage deadline are correlated with the identification information of the management label L as management information and recognized. When there is a deficiency in the items recognized as described above (when there is a NULL item: S57: NO), the control unit 20 causes that to be displayed by the display unit 24 (S58), and the process ends. In this case, as in the case where the code image G1 is not recognized (S51: NO), the worker may perform the work again after reviewing the work. In a case where there is no deficiency in the items recognized as described above (when there are no NULL items: S57: YES), the control unit 20 transmits the recognized management information to the server 1 (S59).

In FIG. 5, the server 1 receives this management information (S7), and the control unit 10 can store this management information in the storage unit 11 (S8). On the other hand, in the server 1, the administrator and the contact address (electronic mail address or the like) corresponding to the administrator are stored in the storage unit 11 in advance. Therefore, the control unit 10 in the server 1 can store the management information and the contact information corresponding to the administrator in the storage unit 11 for each identification information. Alternatively, when transmitting the management information from the image forming apparatus 2 to the server 1 (S59), the control unit 20 prompts the worker to input the contact information and to simultaneously transmit this contact information, whereby the server 1 side may recognize the contact information.

As a result, in the server 1, the control unit 10 can recognize the storage deadline for each identification information (package S), and can recognize the contact address of the administrator thereof, and as described above, in a case where the storage deadline is near, a warning may be sent to the administrator. At this time, from the management information described above, it is possible to properly notify the administrator of the storage location of the target paper documents (package S).

Figure 9:
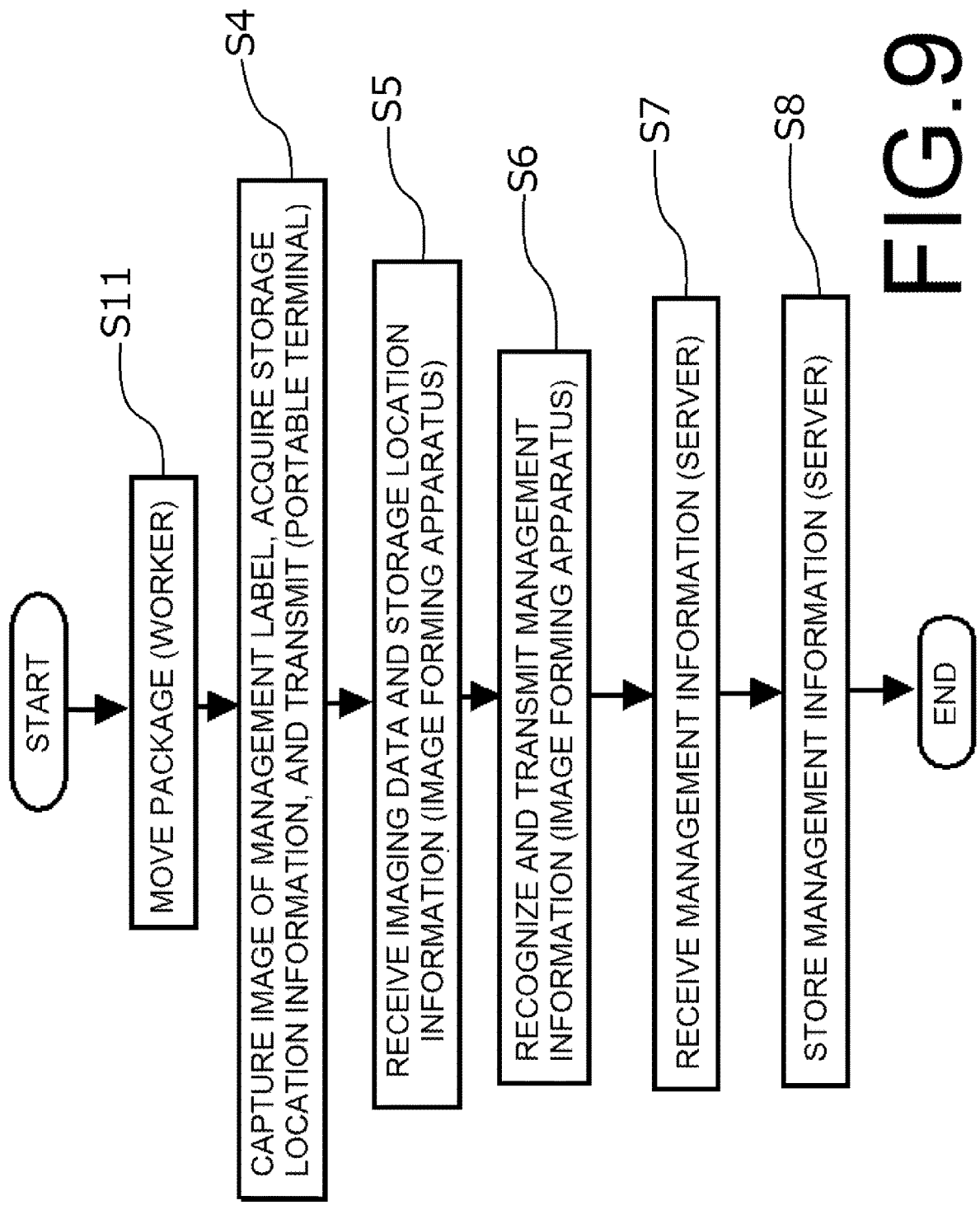
FIG. 9 is a flowchart illustrating operation when moving the storage location of a paper document in the document management system of an embodiment according to the present disclosure.

The flowchart of FIG. 5 illustrates an operation from newly printing a management label L and attaching it to the package S to storing the management data. On the other hand, in a case where the storage location of the package S is changed, the process starting from S3 in FIG. 5 can be similarly performed. In this case, when the package S to which the management label L is attached is moved to a new storage location and the process starting from S4 in FIG. 5 is similarly performed, there is no need to make any changes to the description contents of the management label L. FIG. 9 is a flowchart that illustratively correlates the operation in this case with FIG. 5. Here, after the worker moves the package S to a new storage location (S11), the following processing is performed in the same way as described above. Imaging, acquisition of location information, and transmission by the portable terminal 3 (S4), reception of this information by the image forming apparatus 2 (S5), recognition and transmission of management information (S6) after that, reception of the management information by the server 1 (S7), and storage of the management information (S8) are similarly performed. In the case in FIG. 5, storage of the management information (S8) is newly performed, however in this case, the storage location in the management information that is already stored is rewritten to the most recent storage location and stored. Therefore, by using this document management system, changing the storage location in the management information can be performed easily and accurately. When sending a warning to the administrator after that, it is possible to appropriately recognize the latest storage location.

In addition, even in a case where the worker rewrites the contents of the storage deadline (C4 in FIG. 6) in the management label L instead of moving the storage location (S11) in FIG. 9, the same operation as in FIG. 9 may be performed. In this case, the worker can rewrite the description of the storage deadline in the management label L to a new storage deadline by using a sticker or the like. A case will be described in which the character recognition unit 27 in the image forming apparatus 2 can recognize the numerical value of the storage deadline from the imaging data of the management label L to which the new storage deadline is given. In this case, as in the case of changing the storage location described above, the storage deadline in the management information stored in the storage unit 11 of the server 1 is updated to the most recent storage deadline. In this case, it is possible to change only the description of the storage deadline in the management label L as described above without changing the other descriptions. In this case, the management label L may be newly printed out, and the operation of FIG. 5 may be performed again.

Incidentally, this is the same even when changing not only the storage deadline but also other items (administrator name and the like). That is, a desired item in the management label L in the attached state is rewritten using a sticker or the like, an image of the management label L is newly captured (S4), and it performs the subsequent processes in FIG. 9, thereby this item that is stored in the storage unit 11 may be updated in the same way.

Figure 10:
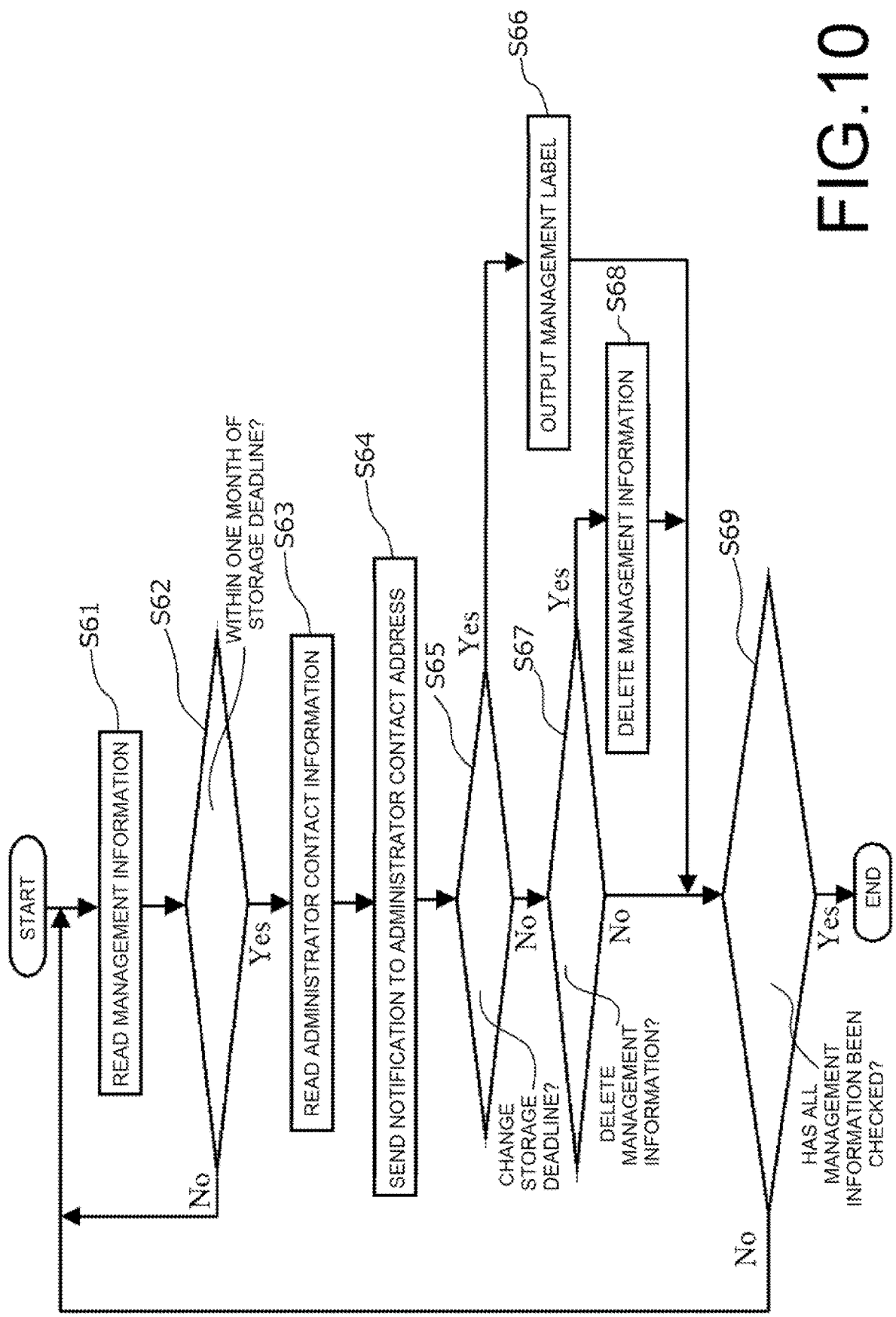
FIG. 10 is a flowchart illustrating operation of an information processing apparatus in the document management system of an embodiment according to the present disclosure.

Next, the operation of the server (information processing apparatus) 1 will be described based on the stored individual management information (particularly, the storage deadline). Here, it is presumed that a warning will be issued in a case where it is within one month of the storage deadline. This operation may be performed, for example, once a day. FIG. 10 is a flowchart illustrating the operation in this case. This operation is performed for each individual piece of management information (identification information), so the control unit 10 first reads one piece of management information from the storage unit 11 (S61). The control unit 10 recognizes the date and time at this time from the date and time recognition unit 15, and in a case where it is not within one month of the storage deadline in the management information (S62: NO), the next management information is read without performing the process regarding this management information (S61).

In a case where the date and time at this time is within one month of the storage deadline (S62: YES), the control unit 10 reads the administrator contact information of the administrator in the management information from the storage unit 11 (S63). After that, a notification (warning) is issued to this administrator contact address (electronic mail address or the like) to notify that the storage deadline of the paper documents corresponding to this administrator information is near (S64). FIG. 11 illustrates an example of a notification screen at this time. Here, this notification is performed by sending electronic mail to a portable terminal owned by the administrator, and this portable terminal does not have to be the same as the portable terminal 3 described above. However, for simplicity, it is presumed here that this portable terminal has the same configuration as that of the portable terminal 3 described above, and this display is performed by the display unit 33 in FIG. 3. Here, the storage location of the target package S is specified based on the storage location information described above, and the title of a document is also specified based on the document information. Moreover, in order to specify that this notification is based on management information having identification information corresponding to the code image G1, the code image G1 in this case is also displayed. In this case, for example, an image of this code image G1 is captured by another portable terminal or the like in order for the administrator to confirm in more detail the details of the indicated package S (management label L). Then, this imaging data can be transmitted to the image forming apparatus 2, and the image forming apparatus 2 can obtain details of the corresponding management information from the server 1.

In addition, in FIG. 11, an inquiry (S65) is also made as to whether or not the displayed storage deadline is to be changed (extended). In a case where an answer is obtained from the administrator side indicating that the administrator wishes to extend the storage deadline (S65: YES), the control unit 10 causes the image forming apparatus 2 to newly output a management label L. (S66). Here, the items of department, name, and contents (C1 to C3) in FIG. 6, instead of being blank, can be written by the image forming apparatus 2 recognizing the information from the read management information. Moreover, at this time, the same identification information (code image G1) is given. Moreover at the same time as this answer (S65: YES), the administrator is prompted to input a new storage deadline, and this new storage deadline is described in the storage deadline item (C4) in FIG. 6, after which the management label L is outputted. After that, the administrator attaches the new management label L to the target package S, and by performing the same operation as the operation in a case where the storage deadline is changed, the new management information is stored in the storage unit 11.

When the storage deadline is not changed (S65: NO), it is estimated that the corresponding paper documents will be disposed of in a short time. Therefore, the control unit 10, as in the case of the notification (S64), inquires of the administrator whether or not to delete this management information (S67). In a case where the administrator desires this deletion (S67: YES), the control unit 10 deletes this management information (S68). As a result, after this, no notification (S64) or the like regarding this management information is performed. In a case where deletion of the management information is not desired (S67: NO), the management information is not deleted, so even the next day and after, the same notification (S64) or the like as described above is performed and sent to the administrator.

The operation described above is performed for all the stored management information, and after the operation described above is performed for all the management information (S69: YES), the process ends. The operation described above may be performed once a day when the storage deadline is managed on a daily basis.

In the document management system above, as described above, even in a case where there is a change in the storage deadline or the storage location, the most recent information is properly stored as management information, so the notification (S64) described above can always be properly performed. Deletion of the management information (S68) is also appropriately performed when disposing of the paper documents, so performing an unnecessary notification (S64) is also suppressed.

Note that in the example described above, the image forming apparatus 2 is used to mediate data between the portable terminal 3 and the server (the information processing apparatus 1). However, as a configuration in which data can be directly exchanged between the information processing apparatus and the portable terminal, the information processing apparatus side may perform recognition of administrator information and the like from the imaging data (S55, S56) as described above. In this case, the image forming apparatus is simply used only for outputting the management label L. Conversely, the image forming apparatus may be provided with all of the functions of the server 1 including storage of management information, so there is no need to use an information processing apparatus that is separate from the image forming apparatus.

Moreover, besides the administrator information, storage location information, and storage deadline described above, appropriate settings according to the contents of the paper documents, and the like are possible as the contents of the management information to be stored. These contents may be included as necessary in the notification (S64) described above.

In addition, in the example described above, the code image (QR code) G1 corresponding to the identification information is attached to the management label L or the like, however the form in which the identification information is attached to the management label is arbitrary, as long as the image forming apparatus or information processing apparatus is able to perform the identification thereof.

In a case where paper documents are stored in a package as in the typical technique described above, and particularly when there is a large number of packages, it may be difficult to store all of the packages in the same location. In a case such as this, the storage location of the package (paper documents) may change before the storage deadline, and in some cases, the storage location may change multiple times before the storage deadline. In addition, the storage deadline may be changed depending on the situation.

In a case as this, it is necessary for the administrator to perform work of rewriting the contents stored in the document management system to the most recent contents every time the paper documents are moved. Particularly, in a case where the number of paper documents is large, such an operation becomes very complicated, and in many cases, rewriting is not properly performed. In this case, the processing is delayed because the administrator that receives the above warning is not able to quickly recognize the location of the target paper documents, or in a case where the storage deadline is changed, the administrator may not be able to appropriately recognize that in some cases. Therefore, in some cases the management of paper documents may not be properly performed.

Therefore, even in a case where the storage conditions or the like of paper documents are changed, there is a need for a document management system that can appropriately perform management of paper documents.

With the configuration according to the present disclosure described above, paper document management may be appropriately performed even when there is a change in the storage conditions or the like of paper documents.

What is claimed is:

1. A document management system that performs management of a package that stores documents, and that uses
    a management label provided with items in which administrator information identifying an administrator of the documents, and a storage deadline of the documents are described, and to which own identification information is given; the document management system comprising:
    a portable terminal having: camera that obtains imaging data of a captured image of the management label attached to the package after the administrator information and the storage deadline are entered;
    a GPS location device that recognizes own location information; and
    a portable terminal side control unit for transmitting storage location information that is information related to a storage location of the package and recognized based on the location information, and the imaging data; and
    an information processing apparatus having: a storage unit that stores management information as a group of information in which the administrator information and the storage deadline recognized from the imaging data and the storage location information are correlated with the identification information, for each of the identification information; and
    an information processing apparatus side control unit that compares the storage deadline for each management information with a current date and time, and in case where there is management information having a storage deadline that is near the current date and time, issues a warning to the administrator recognized by the administrator information in the management information.

2. The document management system according to claim 1, wherein
    in the information processing apparatus
    the storage unit correlates administrator contact information that is a contact address of the administrator with the administrator, and stores that administrator contact information; and
    the information processing apparatus side control unit issues the warning to the administrator based on the administrator contact information.

3. The document management system according to claim 1, wherein
    a code image corresponding to the identification information is formed on the management label, and
    the information processing apparatus side control unit correlates the identification information recognized from the code image in the imaging data, the administrator information, the storage deadline, and the storage location information, and stores these as the management information in the storage unit.

4. The document management system according to claim 3 further comprising an image forming apparatus that prints and outputs the management label.

5. The document management system according to claim 4, wherein the image forming apparatus acquires the imaging data and the storage location information from the portable terminal, and transmits the identification information, the administrator information, the storage deadline, and the storage location information recognized from the imaging data to the information processing apparatus.

6. The document management system according to claim 5, wherein the image forming apparatus recognizes the administrator information and the storage deadline by recognizing characters in the imaging data.

7. The document management system according to claim 1, wherein
    in the portable terminal
    the GPS location device recognizes the location information using a GPS signal, and
    the portable terminal side control unit prompts a worker to specify a floor number or a room in a building that is recognized based on the location information, and in addition to the location information, transmits, to the image forming apparatus as the storage location information, said floor number or said room in a building.

8. The document management system according to claim 7, wherein
    the information processing apparatus side control unit, when issuing a warning to the administrator, provides the storage location information in the management information corresponding to the administrator.

* * * * *